Feb. 19, 1935.  J. I. ANDERSON  1,991,483
DIRECTION INDICATOR
Filed Nov. 28, 1930  2 Sheets-Sheet 1
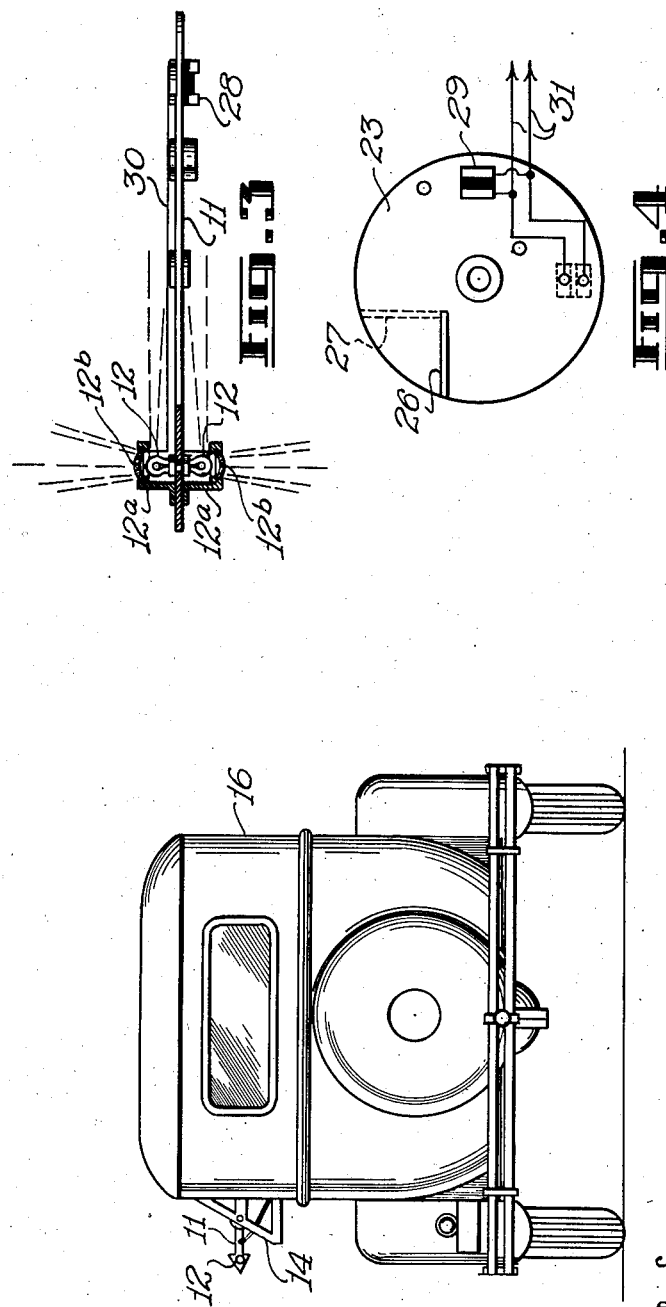
INVENTOR
J.I. Anderson
By
W. Jinn Haskett
Attorney

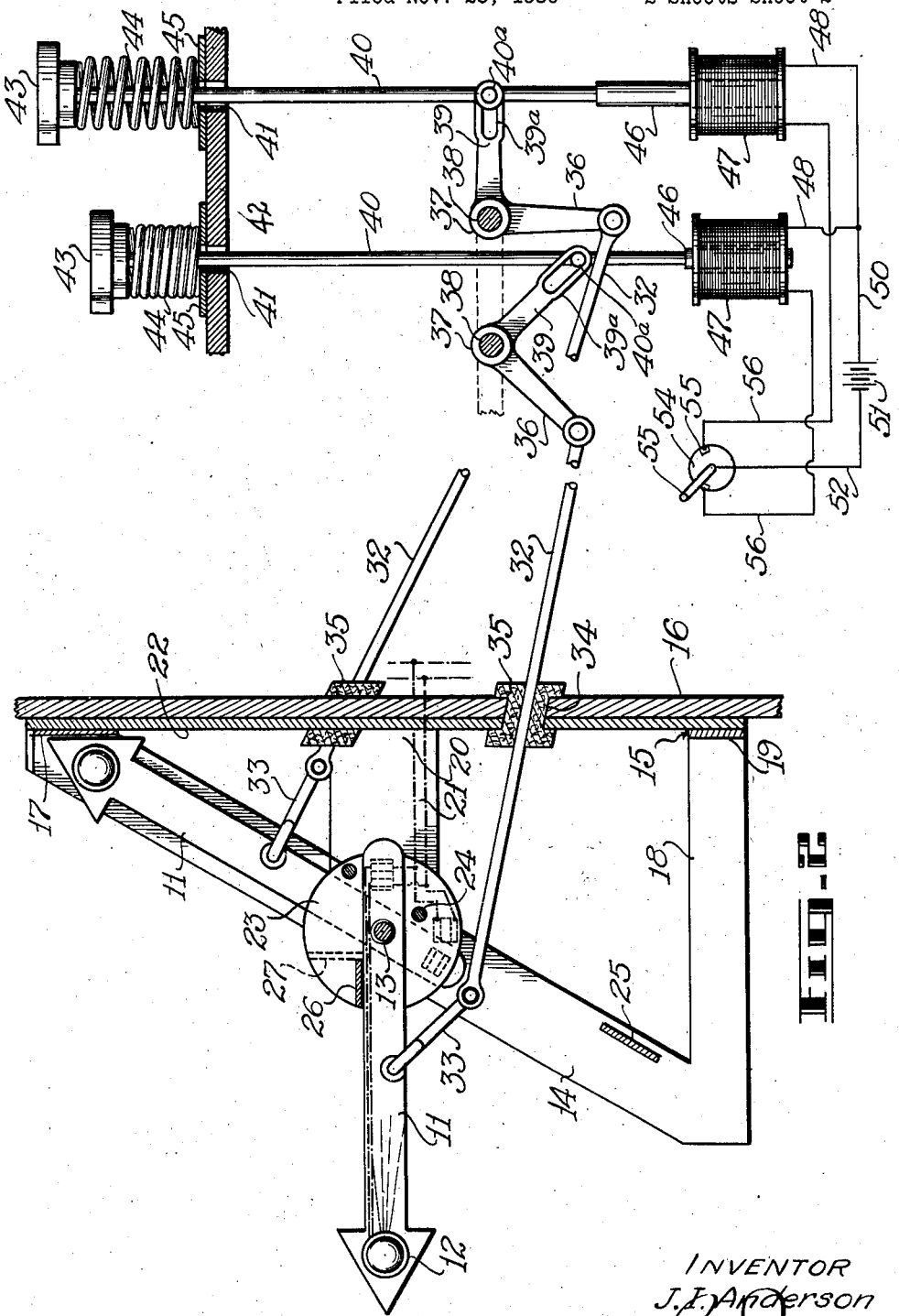

Patented Feb. 19, 1935

1,991,483

UNITED STATES PATENT OFFICE 1,991,483

DIRECTION INDICATOR

John Irvin Anderson, Barnwell, Alberta, Canada

Application November 28, 1930, Serial No. 498,701

2 Claims. (Cl. 177—329)

This present invention relates to certain new and useful improvements in a direction indicator.

The primary object of the invention resides in the provision of a direction indicator for motor vehicles and the like which is of improved and simplified construction and operation and increased efficiency.

The invention has for another object the provision of a direction indicator of the character stated which may be actuated either manually or electrically, as desired.

The invention has for a further object the provision of a direction indicator of the character stated which will clearly indicate the direction of turning of the motor vehicle either in the daytime or at night and which will always be under the control of the operator.

The invention has for a still further object the provision of a direction indicator of the character stated which may be readily mounted on motor vehicles of the conventional type now in general use without requiring extensive alterations therein and at small cost.

The invention has for a still further object the provision of a direction indicator of the character stated which is located on the exterior of the car but controlled from the interior thereof, thus making it unnecessary to open the windows or doors of the car for the purpose of operating the signal and notifying others of the intention of the operator of the car to turn either to the right or the left.

The invention has for a still further object the provision of a direction indicator of the character stated which may be manufactured at small cost and retailed at a popular price with good profit, for attachment to motor vehicles already in use or may be installed on the new motor vehicles during manufacture thereof, at a very low cost, thus providing a commercially attractive proposition.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1 is a rear elevation of a conventional motor vehicle with the direction indicator mounted thereon and showing the direction indicator in operated position to indicate an extended left turn of the motor vehicle;

Figure 2 is a diagrammatic view of the direction indicator, showing in a diagrammatic manner the mounting and arrangement of the various parts of the direction indicator and both the manual control means and the electrical control means;

Figure 3 is a plan view of one of the direction indicator arrow arms; and

Figure 4 is an elevation of the disk showing the stationary switch member over which the arms of the direction indicator operate when being moved to functioning position or to a position of rest.

Referring more in detail to the drawings, it will be noted that a pair of arrow shaped direction indicator arms 11 are employed with a pair of oppositely extended electric bulbs or lamps 12 in the pointed or arrow head outer free ends of each of the arms 11. Each arm 11 has a hood 12a mounted thereon over each bulb or lamp 12, with one side open or cut away for illuminating the arm 11. A lens 12b is supported in the end of each hood 12a opposite the end of the bulb or lamp 12 enclosed and protected by said hood 12a. The arms 11 are adapted to rock on a supporting fulcrum rod or shaft 13 which extends transversely through the inclined outer bars 14 of the frame 15 which is mounted in an appropriate manner on the exterior of the motor vehicle 16, preferably on one side thereof and adjacent the side door or doors of the motor vehicle but sufficiently spaced from said door or doors to prevent interference with operation of the arms 11 while opening and closing the vehicle door or doors.

The frame 15 is of skeleton form with the sides triangular and the inclined side members or bars 14 of the frame connected at their upper ends by a transverse upper frame strip 17. A pair of horizontal bottom frame members 18 extend inwardly from the lower ends of the side members 14 and are connected at their inner ends by the bottom transverse frame strip 19. These frame strips 17 and 19, as well as the inturned rear or inner ends 20 of intermediate side frame members 21, are securely mounted in an appropriate manner on a plate 22 which in turn is secured to the outer face of the motor vehicle body 16 to protect the same from injury.

The direction indicator arms 11 are mounted on the fulcrum rod 13 on opposite sides of the separating disc 23 carried centrally on the rod 13 and connected to the opposite side frame members 14 by oppositely directed pins 24, which serve to hold the disc 23 in proper position and prevent turning thereof on the rod 13. These pins 24 are so located, however, as not to interfere with operation of the direction indicator arms 11 on the rod 13. When the arms 11 are in normal or unoperated and non-functioning position, they are between and parallel with the inclined side frame members 14 and the arm employed for indicating the left turn or intended left turn of the vehicle 16 engages a stop 25 extended as a cross brace between the lower portions of the inclined side frame members 14. When this arm 11 is swung upwardly on the rod 13 to its extended or functioning position, it engages the strip 26 projecting from one side of the disc 23. When the other arm 11 is in its upwardly extended normal and unoperated position, the head of said arm 11 or free end thereof engages the frame strip 17, which latter serves as a stop for this arm 11. When this last mentioned arm 11, however, is swung outwardly on the rod 13 to its upstanding or extended position to indicate an intended right turn of the vehicle 16, this arm 11 engages a stop 27 on the reverse side of the stationary disc 23. Each of the direction indicator arms 11 carries a switch member 28 on its face opposite the stationary disc 23 and near the inner or rear end of the respective arms 11.

The switch members 28 are adapted to respectively engage complementary switch members 29 on the opposed faces of the stationary disc 23, when the respective direction indicator arms 11 are brought to extended or functioning position, the switch members 29 being arranged on the opposite faces of the stationary disc 23, so as to permit this result. The switch members 28 are connected electrically with the bulbs 12 on the respective arms 11, as by means of current conducting wires 30. Likewise, the switch members 20 on the stationary disc 23 have current conducting wires 31 connected thereto and leading to a suitable source of electrical energy, so that a circuit may be completed through the respective bulbs 12 when an arm 11 carrying such bulbs 12 is moved to its operative or functioning position and thus causes engagement of the switch member 28 on such arm 11 with its corresponding switch member 29 carried by the stationary disc 23.

The arms 11 are operated by operating rods 32, each of which has a link 33 pivoted to its forward or outer end and also pivotally connected with one of the arms 11 intermediate the ends of the latter. The rods 32 slide through suitable openings 34 in the side of the motor vehicle body 16 and through sleeves 35 of felt or other appropriate material provided in the openings 34. Each operating rod 32 is pivotally connected with one arm 36 of a bell crank lever 37 fulcrumed on a pin 38 or the like carried by an appropriate part of the car. The remaining arm 39 of each bell crank lever 37 has an elongated longitudinal slot 39a provided therein and in which operates a laterally or radially extended pin 40a carried on the actuating plunger 40 for the bell crank lever 37.

Each actuating plunger 40 may be operated and controlled either manually or electrically, as desired. The actuating plungers 40 operate through openings 41 in a stationary member 42 of the car structure.

For operating and controlling the actuating plungers 40, each of said actuating plungers 40 is provided on its upper end with a cap or head 43 and a helical expansion spring 44 encircles the actuating plungers 40 with one end bearing against the underface of the cap or head 43, while the opposite end of the spring 44 bears against a washer 45 or other member secured on the adjacent or upper face of the car stationary member 42. The springs 44 serve to normally retain the actuating plungers 40 in their unoperated or uppermost position and also to return them to their unoperated or uppermost position, after each operation of the respective actuating plungers 40.

For electrically operating and controlling the actuating plungers 40, provided on the lower end of each actuating plunger 40 below the pin 40a carried thereby, is a solenoid core 46 which is adapted to be drawn downwardly in the solenoid coil 47 provided therefor when the latter is magnetized. A pair of current conducting wires 48 extend from one pole of the pair of solenoid coils 47 and after being connected are continued as a single current conducting wire 50 leading to one pole of a battery 51 or other suitable source of electrical energy. A current conducting wire 52 extends from the other pole of the source of electrical energy 51 and connects with the two-way switch arm 53 of the control switch 54. The switch lever 52 is adapted to be moved to its reverse extreme position for engagement with the respective switch points 55 on the switch 54 and from which switch points 55 extend current conducting wires 56 leading to the remaining poles of the respective solenoid coils 47. Thus it will be seen, that, when the switch lever 53 is in neutral position, the circuit is broken through both of the solenoid coils 47. By moving the switch lever 53 onto one of the switch points 55, however, a circuit will be completed from the source of electrical energy 51 through the selected solenoid coils 47, thus thoroughly magnetizing the latter and causing the solenoid core 46 co-operating therewith to be drawn downwardly in the magnetized solenoid coil 47. This results in actuating the rod 40 carrying the solenoid core 46 to cause operation of the arm 11 controlled by the actuating rod 40 to its extended or functioning position, at the same time causing completion of an electric circuit through the lamps or bulbs 12 carried by said operated arm 11. The operation is the same when controlled electrically as when the rod 40 is forced downwardly by means of pressure on the cap 43 at the upper end thereof and when the circuit is broken through the solenoid coil 47 by return of the lever 53 to neutral position, the spring 44 will act to return all of the operative mechanical parts of the device to normal or unoperated position.

As the construction of the device has thus been described in detail, brief reference is now had to its use and modus operandi. The direction indicator arms 11 normally rest in parallel planes between the frame members 14 of the frame sides and the actuating plungers 40 are normally in their raised or unoperated position. To actuate either arm 11 and bring it to its operated or functioning position, it is simply necessary to depress the proper plunger 40 by pressing downwardly on the cap or head 43 thereof or move the control lever 53 onto the proper contact point 55 and thus force the selected actuating plunger 40 to move downwardly against the action of the spring 44 beneath the head or cap 43 thereof. This causes operation of the bell crank lever 37 controlled by the actuating plunger 40, and through the medium of the rod 32 connected to said bell crank lever 37 and the link 33 connecting the rod 32 with the indicator arm 11, the latter is caused to swing on the rod 13 to its operated or functioning position. As the indicator arm 11 is thus operated, its switch member 28 is brought into engagement with the cooperating switch member 29 provided for this purpose on the stationary disc 23, thus completing a circuit through the bulbs 12 carried by the indicator arm 11 and causing illumination of the same so that the signal may be readily seen at night. When the downward pressure on the cap or head 43 is relieved or the control switch 53 is returned to neutral position, the springs 44 will immediately act to return the actuating rods 40 and all parts controlled thereby to their normal or unoperated position. As the bulbs 12 are protected by the hoods 12a provided for this purpose, danger of injury to the bulbs is reduced to the minimum while at the same time, the lenses 12b carried by the hoods 12a opposite the bulbs 12, provide for throwing a clearer beam of light from each bulb so that the direction indicator lights and the arms 11 may be readily observed. For the daytime, a conventional switch in the circuit for the lamps 12 may be opened, so as to prevent illumination of the lamps 12 when they are not required.

From the foregoing description taken in connection with the accompanying drawings, it will be manifest that a direction indicator is provided that will fulfill all the necessary requirements of such a device but as many changes could be made in the above description and many apparently widely different embodiments of my invention may be constructed within the scope of the appended claims without departing from the spirit or scope thereof, it is intended that all maters contained in the said accompanying specification and drawings shall be interpreted as illustrative and not in a limitative or restrictive sense.

Having thus described my invention, what I claim as new and desire to secure by Letters Patent is:—

1. A direction indicator including an open skeleton frame composed of two parallel triangular side members joined at the top and the bottom by base members; a mounting plate fastened to said base members of the frame and adapted to be applied laterally to a motor vehicle body; a cross brace joining said triangular side members of the frame on the side thereof remote from the base plate and near the bottom; a shaft extended horizontally through said frame bridging the space between said side members; a separating disc mounted on said shaft and fastened to said frame; a pair of stop strips lying in planes at right angles to one another projecting from opposite sides thereof; an indicator arm mounted to rock on said shaft on each side of said separating disc as far as its respective stop strip, one of said arms being adapted to lie normally inoperative against said top base member of said frame and the other of said arms being adapted to rest inoperative against said cross brace near the bottom of said frame; and means connecting with each of said indicator arms whereby said indicator arms may be moved individually or in unison into or out of inoperative position.

2. A direction indicator including an open frame composed of two spaced parallel side members joined by upper and lower transverse strips; a shaft extended through said frame; a pair of indicator arms fulcrumed on said shaft; a separating disc on said shaft between said arms; oppositely directed pins carried by said frame side members to hold said disc against turning; stop strips extended from opposite sides of said separating disc and lying in planes at right angles to one another; and means for individually moving said arms to and from functioning position against said stop strips.

JOHN IRVIN ANDERSON. [L. S.]